United States Patent
Malik et al.

(10) Patent No.: US 10,438,238 B2
(45) Date of Patent: *Oct. 8, 2019

(54) CONTEXTUAL INFORMATION

(71) Applicant: Facebook, Inc., Menlo Park, CA (US)

(72) Inventors: Dale W. Malik, Dunwoody, GA (US); Richard A. Anderson, Alpharetta, GA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/323,464

(22) Filed: Jul. 3, 2014

(65) Prior Publication Data

US 2014/0317144 A1    Oct. 23, 2014

Related U.S. Application Data

(63) Continuation of application No. 13/687,068, filed on Nov. 28, 2012, which is a continuation of application
(Continued)

(51) Int. Cl.
*G06Q 30/00* (2012.01)
*G06Q 30/02* (2012.01)
(Continued)

(52) U.S. Cl.
CPC ....... *G06Q 30/0257* (2013.01); *G06F 3/0482* (2013.01); *G06F 16/958* (2019.01); *G06F 21/62* (2013.01); *G06Q 10/107* (2013.01); *G06Q 10/109* (2013.01); *G06Q 30/02* (2013.01); *G06Q 30/0267* (2013.01); *G06Q 30/0269* (2013.01); *H04L 29/12169* (2013.01);
(Continued)

(58) Field of Classification Search
USPC ....... 709/206, 224, 204, 203, 227, 205, 223, 709/225, 219, 220, 226, 229, 201, 207, 709/217, 231, 202, 213, 221, 222, 228, 709/230, 245, 218, 238, 248, 249; 379/142.06, 126, 67.1, 88.12, 88.13, 379/93.24, 102.03, 114.13, 116, 119, 379/207.01, 265.02, 52, 88.17, 88.21, 379/90.01

See application file for complete search history.

(56) References Cited

U.S. PATENT DOCUMENTS 4,266,098 A    5/1981   Novak
4,703,423 A   10/1987   Bado et al.
(Continued)

FOREIGN PATENT DOCUMENTS

WO    WO 97/17774    5/1997
WO    WO 03/056821   7/2003

OTHER PUBLICATIONS

U.S. Appl. No. 14/323,973, filed Jul. 3, 2014, Malik et al.
(Continued)

*Primary Examiner* — Michael W Schmucker
(74) *Attorney, Agent, or Firm* — Keller Jolley Preece (57) ABSTRACT

Methods, systems, and products provide contextual information for communications. A call, for example, is processed from an origination address to a destination address. A query is made for a brand of device associated with the origination address making the call. The brand of device is announced during the call.

25 Claims, 4 Drawing Sheets

Related U.S. Application Data

No. 10/184,588, filed on Jun. 28, 2002, now Pat. No. 8,341,018, which is a continuation-in-part of application No. 09/966,703, filed on Sep. 28, 2001, now Pat. No. 7,313,617.

(51) Int. Cl.

| | |
|---|---|
| *G06F 16/958* | (2019.01) |
| *G06Q 10/10* | (2012.01) |
| *H04L 29/12* | (2006.01) |
| *H04L 12/58* | (2006.01) |
| *H04M 3/22* | (2006.01) |
| *H04M 3/436* | (2006.01) |
| *H04M 3/53* | (2006.01) |
| *G06F 21/62* | (2013.01) |
| *H04L 12/24* | (2006.01) |
| *H04L 29/08* | (2006.01) |
| *G06F 3/0482* | (2013.01) |
| *H04L 29/06* | (2006.01) |
| *H04M 3/42* | (2006.01) |
| *H04M 3/537* | (2006.01) |
| *H04M 7/00* | (2006.01) |
| *H04M 7/12* | (2006.01) |

(52) U.S. Cl.
CPC .............. *H04L 41/22* (2013.01); *H04L 51/04* (2013.01); *H04L 51/24* (2013.01); *H04L 51/36* (2013.01); *H04L 61/1576* (2013.01); *H04L 65/403* (2013.01); *H04L 67/32* (2013.01); *H04M 3/2218* (2013.01); *H04M 3/436* (2013.01); *H04M 3/5307* (2013.01); *H04L 67/2804* (2013.01); *H04L 69/329* (2013.01); *H04M 3/4211* (2013.01); *H04M 3/42059* (2013.01); *H04M 3/537* (2013.01); *H04M 7/0036* (2013.01); *H04M 7/0045* (2013.01); *H04M 7/0054* (2013.01); *H04M 7/128* (2013.01); *H04M 7/1235* (2013.01); *H04M 2203/2066* (2013.01); *H04M 2242/22* (2013.01); *H04Q 2213/13175* (2013.01); *H04Q 2213/13338* (2013.01); *H04Q 2213/13377* (2013.01)

(56) References Cited

U.S. PATENT DOCUMENTS

| | | | |
|---|---|---|---|
| 4,706,242 A | 11/1987 | Harland | |
| 4,850,007 A | 7/1989 | Marino et al. | |
| 4,935,954 A | 6/1990 | Thompson et al. | |
| 4,969,136 A | 11/1990 | Chamberlin et al. | |
| 4,975,896 A | 12/1990 | D'Agosto et al. | |
| 5,311,583 A | 5/1994 | Friedes et al. | |
| 5,404,505 A | 4/1995 | Levinson | |
| 5,436,965 A | 7/1995 | Grossman et al. | |
| 5,570,417 A | 10/1996 | Byers | |
| 5,592,470 A | 1/1997 | Rudrapatna et al. | |
| 5,604,492 A | 2/1997 | Abdul-Halim | |
| 5,608,786 A | 3/1997 | Gordon | |
| 5,621,790 A | 4/1997 | Grossman et al. | |
| 5,644,624 A | 7/1997 | Caldwell | |
| 5,661,783 A | 8/1997 | Assis | |
| 5,703,571 A | 12/1997 | Cannon et al. | |
| 5,708,775 A | 1/1998 | Nakamura | |
| 5,802,510 A | 9/1998 | Jones | |
| 5,812,654 A | 9/1998 | Anderson et al. | |
| 5,818,438 A | 10/1998 | Howe et al. | |
| 5,818,447 A | 10/1998 | Wolf et al. | |
| 5,822,410 A | 10/1998 | McCausland et al. | |
| 5,852,775 A | 12/1998 | Hidary | |
| 5,872,841 A | 2/1999 | King et al. | |
| 5,889,799 A | 3/1999 | Grossman et al. | |
| 5,892,508 A | 4/1999 | Howe et al. | |
| 5,909,589 A | 6/1999 | Parker et al. | |
| 5,937,047 A | 8/1999 | Stabler | |
| 5,943,417 A | 8/1999 | Cox et al. | |
| 5,946,386 A | 8/1999 | Rogers | |
| 5,966,437 A | 10/1999 | Cox et al. | |
| 5,974,388 A | 10/1999 | Durham | |
| 5,978,475 A | 11/1999 | Schneier et al. | |
| 5,987,100 A | 11/1999 | Fortman et al. | |
| 6,002,394 A | 12/1999 | Schein et al. | |
| 6,014,135 A | 1/2000 | Fernandes | |
| 6,023,700 A | 2/2000 | Owens et al. | |
| 6,052,730 A | 4/2000 | Felciano et al. | |
| 6,055,512 A | 4/2000 | Dean et al. | |
| 6,065,047 A | 5/2000 | Carpenter et al. | |
| 6,075,850 A | 6/2000 | Ali et al. | |
| 6,084,628 A | 7/2000 | Sawyer | |
| 6,088,588 A | 7/2000 | Osborne | |
| 6,091,802 A | 7/2000 | Smith et al. | |
| 6,097,942 A | 8/2000 | Laiho | |
| 6,118,856 A | 9/2000 | Paarsmarkt et al. | |
| 6,125,108 A | 9/2000 | Shaffer et al. | |
| 6,128,624 A | 10/2000 | Papierniak et al. | |
| 6,133,853 A | 10/2000 | Obradovich et al. | |
| 6,134,235 A | 10/2000 | Goldman et al. | |
| 6,144,644 A | 11/2000 | Bajzath et al. | |
| 6,147,975 A | 11/2000 | Bowman-Amuah | |
| 6,148,261 A | 11/2000 | Obradovich et al. | |
| 6,148,329 A | 11/2000 | Meyer | |
| 6,151,584 A | 11/2000 | Papierniak et al. | |
| 6,154,530 A | 11/2000 | Letellier | |
| 6,157,709 A | 12/2000 | Lawser et al. | |
| 6,167,119 A | 12/2000 | Bartholomew et al. | |
| 6,182,142 B1 | 1/2001 | Win et al. | |
| 6,205,211 B1 | 3/2001 | Thomas et al. | |
| 6,208,721 B1 | 3/2001 | Feinberg et al. | |
| 6,216,104 B1 | 4/2001 | Moshfeghi et al. | |
| 6,233,317 B1 | 5/2001 | Homan et al. | |
| 6,236,768 B1 | 5/2001 | Rhodes | |
| 6,237,027 B1 | 5/2001 | Namekawa | |
| 6,247,043 B1 | 6/2001 | Bates et al. | |
| 6,252,672 B1 | 6/2001 | Sugawara et al. | |
| 6,253,188 B1 | 6/2001 | Witek et al. | |
| 6,266,690 B1 | 7/2001 | Shankarappa et al. | |
| 6,272,150 B1 | 8/2001 | Hrastar et al. | |
| 6,272,537 B1 | 8/2001 | Kekic et al. | |
| 6,282,275 B1 | 8/2001 | Gurbani | |
| 6,301,245 B1 | 10/2001 | Luzeski et al. | |
| 6,301,342 B1 | 10/2001 | Ander et al. | |
| 6,304,635 B1 | 10/2001 | Iwani et al. | |
| 6,308,328 B1 | 10/2001 | Bowcutt et al. | |
| 6,317,485 B1 | 11/2001 | Homan et al. | |
| 6,320,947 B1 | 11/2001 | Joyce et al. | |
| 6,330,079 B1 | 12/2001 | Dugan et al. | |
| 6,338,066 B1 | 1/2002 | Martin et al. | |
| 6,339,639 B1 | 1/2002 | Henderson | |
| 6,345,239 B1 | 2/2002 | Bowman-Amuah | |
| 6,351,771 B1 | 2/2002 | Craddock et al. | |
| 6,353,659 B1 | 3/2002 | VanRyzin et al. | |
| 6,353,852 B1 | 3/2002 | Nestoriak et al. | |
| 6,360,254 B1 | 3/2002 | Linden et al. | |
| 6,385,311 B1 | 5/2002 | Bauer et al. | |
| 6,400,810 B1 | 6/2002 | Skladman et al. | |
| 6,404,762 B1 | 6/2002 | Luzeski et al. | |
| 6,411,685 B1 | 6/2002 | O'Neal | |
| 6,421,725 B1 | 7/2002 | Vermilyea et al. | |
| 6,424,966 B1 | 7/2002 | Meyerzon et al. | |
| 6,424,995 B1 | 7/2002 | Shuman | |
| 6,430,177 B1 | 8/2002 | Luzeski et al. | |
| 6,430,188 B1 | 8/2002 | Kadambi et al. | |
| 6,434,747 B1 | 8/2002 | Khoo et al. | |
| 6,445,682 B1 | 9/2002 | Weitz | |
| 6,445,913 B1 | 9/2002 | Ezuriko | |
| 6,453,353 B1 | 9/2002 | Win et al. | |
| 6,459,782 B1 | 10/2002 | Bedrosian | |
| 6,460,082 B1 | 10/2002 | Lumelsky et al. | |
| 6,493,437 B1 | 12/2002 | Olshansky | |
| 6,496,838 B1 | 12/2002 | Zamora-Mckelvy et al. | |
| 6,502,242 B1 | 12/2002 | Howe et al. | |

(56) References Cited

U.S. PATENT DOCUMENTS

| | | |
|---|---|---|
| 6,515,968 B1 | 2/2003 | Combar et al. |
| 6,518,984 B1 | 2/2003 | Maeckel et al. |
| 6,526,044 B1 | 2/2003 | Cookmeyer et al. |
| 6,529,954 B1 | 3/2003 | Cookmeyer et al. |
| 6,535,585 B1 | 3/2003 | Hanson et al. |
| 6,556,666 B1 | 4/2003 | Beyda et al. |
| 6,560,633 B1 | 5/2003 | Roberts |
| 6,564,261 B1 | 5/2003 | Gudjonsson et al. |
| 6,567,982 B1 | 5/2003 | Howe et al. |
| 6,570,855 B1 | 5/2003 | Kung et al. |
| 6,574,678 B1 | 6/2003 | Nykaned et al. |
| 6,594,255 B1 | 7/2003 | Neuman |
| 6,608,637 B1 | 8/2003 | Beaton et al. |
| 6,609,253 B1 | 8/2003 | Swix et al. |
| 6,611,501 B1 | 8/2003 | Owen et al. |
| 6,615,184 B1 | 9/2003 | Hicks |
| 6,615,241 B1 | 9/2003 | Miller et al. |
| 6,625,258 B1 | 9/2003 | Ram et al. |
| 6,631,186 B1 | 10/2003 | Adams et al. |
| 6,631,402 B1 | 10/2003 | Devine |
| 6,633,630 B1 | 10/2003 | Owens et al. |
| 6,640,230 B1 | 10/2003 | Alexander et al. |
| 6,640,241 B1 | 10/2003 | Ozzie et al. |
| 6,665,378 B1 | 12/2003 | Spielman et al. |
| 6,699,007 B2 | 3/2004 | Huang et al. |
| 6,701,348 B2 | 3/2004 | Sommerer |
| 6,708,202 B1 | 3/2004 | Shuman et al. |
| 6,711,154 B1 | 3/2004 | O'Neal |
| 6,717,513 B1 | 4/2004 | Sandelman et al. |
| 6,721,748 B1 | 4/2004 | Knight et al. |
| 6,731,927 B1 | 5/2004 | Stern et al. |
| 6,735,286 B1 | 5/2004 | Hansen et al. |
| 6,738,462 B1 | 5/2004 | Brunson |
| 6,741,697 B2 | 5/2004 | Benson et al. |
| 6,745,229 B1 | 6/2004 | Gobin et al. |
| 6,747,970 B1 | 6/2004 | Lamb et al. |
| 6,748,056 B1 | 6/2004 | Capriotti et al. |
| 6,754,181 B1 | 6/2004 | Elliott et al. |
| 6,757,732 B1 | 6/2004 | Sollee et al. |
| 6,760,601 B1 | 7/2004 | Suoknunti |
| 6,760,727 B1 | 7/2004 | Schroeder et al. |
| 6,763,102 B1 | 7/2004 | Chen |
| 6,766,369 B1 | 7/2004 | Haitsuka et al. |
| 6,768,722 B1 | 7/2004 | Katseff et al. |
| 6,772,188 B1 | 8/2004 | Cloutier |
| 6,782,086 B2 | 8/2004 | Clapper |
| 6,785,266 B2 | 8/2004 | Swartz |
| 6,785,379 B1 | 8/2004 | Rogers |
| 6,788,926 B1 | 9/2004 | Frangione et al. |
| 6,798,868 B1 | 9/2004 | Montgomery et al. |
| 6,804,707 B1 | 10/2004 | Ronning |
| 6,804,716 B1 | 10/2004 | Koch et al. |
| 6,806,977 B1 | 10/2004 | Freeny et al. |
| 6,807,423 B1 | 10/2004 | Armstrong et al. |
| 6,807,574 B1 | 10/2004 | Partovi et al. |
| 6,816,469 B1 | 11/2004 | Kung et al. |
| 6,820,204 B1 | 11/2004 | Desai et al. |
| 6,826,639 B2 | 11/2004 | Pasumansky |
| 6,829,233 B1 | 12/2004 | Gilboy |
| 6,834,195 B2 | 12/2004 | Brandenberg et al. |
| 6,839,414 B1 | 1/2005 | Enzmann et al. |
| 6,842,767 B1 | 1/2005 | Partovi et al. |
| 6,853,711 B2 | 2/2005 | Brisebois et al. |
| 6,857,024 B1 | 2/2005 | Chen |
| 6,879,995 B1 | 4/2005 | Chinta et al. |
| 6,882,709 B1 | 4/2005 | Sherlock |
| 6,892,083 B2 | 5/2005 | Shostak |
| 6,895,426 B1 | 5/2005 | Cotright et al. |
| 6,895,559 B2 | 5/2005 | Forder |
| 6,904,137 B2 | 6/2005 | Brandt et al. |
| 6,910,186 B2 | 6/2005 | Kim |
| 6,914,967 B1 | 7/2005 | Baca et al. |
| 6,917,610 B1 | 7/2005 | Kung |
| 6,920,208 B1 | 7/2005 | Rosen |
| 6,920,213 B2 | 7/2005 | Pershan |
| 6,928,154 B1 | 8/2005 | Cheaito |
| 6,940,958 B2 | 9/2005 | Clapper |
| 6,947,979 B1 | 9/2005 | Pon |
| 6,948,838 B2 | 9/2005 | Ruthfield et al. |
| 6,961,751 B1 | 11/2005 | Bates et al. |
| 6,973,556 B2 | 12/2005 | Milligan et al. |
| 6,980,982 B1 | 12/2005 | Geddes et al. |
| 6,981,023 B1 | 12/2005 | Hamilton et al. |
| 6,981,040 B1 | 12/2005 | Konig et al. |
| 6,981,223 B2 | 12/2005 | Becker |
| 6,988,128 B1 | 1/2006 | Alexander et al. |
| 7,007,085 B1 | 2/2006 | Malik |
| 7,031,961 B2 | 4/2006 | Pitkow et al. |
| 7,062,535 B1 | 6/2006 | Stark |
| 7,088,805 B1 | 8/2006 | Moore |
| 7,092,936 B1 | 8/2006 | Alonso et al. |
| 7,096,232 B2 | 8/2006 | Doss |
| 7,107,275 B2 | 9/2006 | Quinn et al. |
| 7,117,504 B2 | 10/2006 | Smith et al. |
| 7,130,891 B2 | 10/2006 | Bernardin et al. |
| 7,171,448 B1 | 1/2007 | Danielson et al. |
| 7,213,005 B2 | 5/2007 | Mourad et al. |
| 7,225,409 B1 | 5/2007 | Schnarel et al. |
| 7,263,505 B1 | 8/2007 | Forlai |
| 7,272,633 B2 | 9/2007 | Malik |
| 7,313,617 B2 | 12/2007 | Malik |
| 7,325,032 B2 | 1/2008 | Zuberec et al. |
| 7,441,027 B2 | 10/2008 | Malik |
| 7,472,187 B2 | 12/2008 | Malik |
| 7,496,189 B2 | 2/2009 | Clarisse et al. |
| 7,525,955 B2 | 4/2009 | Velez-Rivera et al. |
| 7,778,399 B2 | 8/2010 | Ambrose |
| 7,860,804 B2 | 12/2010 | Littrell |
| 7,929,951 B2 | 4/2011 | Stevens |
| 8,023,622 B2 | 9/2011 | Timmins et al. |
| 8,271,591 B2 | 9/2012 | Malik |
| 8,341,018 B2 | 12/2012 | Malik |
| 8,423,412 B2 | 4/2013 | Vierl |
| 8,554,693 B2 | 10/2013 | Littrell |
| 8,554,718 B2 | 10/2013 | Gage |
| 8,560,673 B2 | 10/2013 | Malik |
| 2001/0013050 A1 | 8/2001 | Shah |
| 2001/0013069 A1* | 8/2001 | Shah .......................... 709/238 |
| 2001/0027478 A1* | 10/2001 | Meier et al. .................. 709/206 |
| 2001/0029468 A1 | 10/2001 | Yamaguchi |
| 2002/0029163 A1 | 3/2002 | Joao |
| 2002/0055924 A1 | 5/2002 | Liming |
| 2002/0059117 A1 | 5/2002 | Yoch et al. |
| 2002/0069048 A1* | 6/2002 | Sadhwani et al. ................ 704/3 |
| 2002/0073142 A1 | 6/2002 | Moran |
| 2002/0076015 A1 | 6/2002 | Norwitz et al. |
| 2002/0078151 A1* | 6/2002 | Wickam et al. .............. 709/204 |
| 2002/0091829 A1 | 7/2002 | Wood |
| 2002/0092021 A1 | 7/2002 | Yap et al. |
| 2002/0098849 A1 | 7/2002 | Bloebaum et al. |
| 2002/0099657 A1 | 7/2002 | Black et al. |
| 2002/0099775 A1 | 7/2002 | Gupta et al. |
| 2002/0099777 A1 | 7/2002 | Gupta et al. |
| 2002/0111813 A1 | 8/2002 | Capps |
| 2002/0124057 A1 | 9/2002 | Besprosvan |
| 2002/0174110 A1 | 11/2002 | Smith |
| 2002/0174188 A1 | 11/2002 | Clark et al. |
| 2002/0180776 A1 | 12/2002 | Fishman |
| 2002/0184329 A1 | 12/2002 | Chen et al. |
| 2002/0194274 A1 | 12/2002 | Kroeger |
| 2003/0009530 A1 | 1/2003 | Philonenko et al. |
| 2003/0014553 A1 | 1/2003 | Zhao |
| 2003/0023757 A1 | 1/2003 | Ishioka et al. |
| 2003/0065778 A1 | 4/2003 | Malik |
| 2003/0087652 A1 | 5/2003 | Simon et al. |
| 2003/0156134 A1 | 8/2003 | Kim |
| 2004/0091091 A1 | 5/2004 | Maruyama |
| 2004/0125133 A1 | 7/2004 | Pea et al. |
| 2004/0236619 A1 | 11/2004 | Gundersen et al. |
| 2004/0254999 A1 | 12/2004 | Bulleit et al. |
| 2005/0038863 A1 | 2/2005 | Onyon et al. |
| 2005/0120305 A1 | 6/2005 | Engstrom et al. |
| 2005/0149487 A1 | 7/2005 | Celik |
| 2005/0188043 A1 | 8/2005 | Cortright et al. |

(56) References Cited

U.S. PATENT DOCUMENTS

| | | |
|---|---|---|
| 2005/0204030 A1 | 9/2005 | Koch et al. |
| 2006/0062205 A1 | 3/2006 | Doherty et al. |
| 2007/0100967 A1 | 5/2007 | Smith |
| 2007/0130338 A1 | 6/2007 | Malik |
| 2012/0078725 A1 | 3/2012 | Maitra et al. |
| 2013/0138513 A1 | 5/2013 | Malik |

OTHER PUBLICATIONS

U.S. Appl. No. 14/325,039, filed Jul. 7, 2014, Malik et al.
U.S. Appl. No. 14/325,053, filed Jul. 7, 2014, Malik et al.
U.S. Appl. No. 14/448,725, filed Jul. 31, 2014, Malik et al.
U.S. Appl. No. 14/323,447, filed Jul. 3, 2014, Malik et al.
U.S. Appl. No. 14/323,472, filed Jul. 3, 2014, Malik et al.
U.S. Appl. No. 14/323,969, filed Jul. 3, 2014, Malik et al.
U.S. Appl. No. 14/328,509, filed Jul. 10, 2014, Malik et al.
U.S. Appl. No. 14/328,516, filed Jul. 10, 2014, Malik et al.
"Delivering dollars on demand: cable industry weighs different models to build revenue," Nov. 3, 2003; Braodcasting & Cable, v133, n44, p. S3, 8pp.
VH1, "Pop-Up Video," 1980s, VH1.com, www.vh1.com/shows/dyn/pop_up_video/series_about.html, pp. 1-2, retrieved May 2, 2007.
VH1, "Pop-Up Video," Oct. 26, 2002, VH1.com, web.archive.org/web/20021026183153/http://www.vh1.com/shows/dyn/pop_up_video/series_about.html, p. 1.
U.S. Appl. No. 09/966,703, Nov. 17, 2005, Office Action.
U.S. Appl. No. 09/966,703, May 26, 2006, Office Action.
U.S. Appl. No. 09/966,703, May 2, 2007, Office Action.
U.S. Appl. No. 09/966,703, Oct. 25, 2007, Notice of Allowance.
U.S. Appl. No. 10/109,909, Jul. 15, 2004, Office Action.
U.S. Appl. No. 10/109,909, Jan. 24, 2005, Office Action.
U.S. Appl. No. 10/109,909, Jul. 21, 2005, Notice of Allowance.
U.S. Appl. No. 10/184,588, Nov. 30, 2005, Office Action.
U.S. Appl. No. 10/184,588, Aug. 11, 2006, Office Action.
U.S. Appl. No. 10/184,588, Apr. 9, 2007, Office Action.
U.S. Appl. No. 10/184,588, Sep. 13, 2007, Office Action.
U.S. Appl. No. 10/184,588, Jan. 9, 2008, Office Action.
U.S. Appl. No. 10/184,588, Aug. 4, 2008, Office Action.
U.S. Appl. No. 10/184,588, Dec. 10, 2008, Office Action.
U.S. Appl. No. 10/184,588, May 21, 2009, Office Action.
U.S. Appl. No. 10/184,588, Nov. 10, 2009, Office Action.
U.S. Appl. No. 10/184,588, May 7, 2010, Office Action.
U.S. Appl. No. 10/184,588, Oct. 13, 2010, Office Action.
U.S. Appl. No. 10/184,588, Aug. 20, 2012, Notice of Allowance.
U.S. Appl. No. 10/184,670, Jun. 9, 2008, Office Action.
U.S. Appl. No. 10/184,670, Nov. 18, 2008, Office Action.
U.S. Appl. No. 10/184,670, Apr. 1, 2009, Office Action.
U.S. Appl. No. 10/184,670, Oct. 23, 2009, Office Action.
U.S. Appl. No. 10/184,670, May 26, 2010, Office Action.
U.S. Appl. No. 10/184,670, Nov. 24, 2010, Office Action.
U.S. Appl. No. 10/184,670, Aug, 14, 2013, Office Action.
U.S. Appl. No. 10/184,670, Nov. 26, 2013, Office Action.
U.S. Appl. No. 10/251,025, Nov. 4, 2005, Office Action.
U.S. Appl. No. 10/251,025, Apr. 24, 2006, Office Action.
U.S. Appl. No. 10/251,025, Jan. 5, 2007, Office Action.
U.S. Appl. No. 10/251,025, Jul. 5, 2007, Notice of Allowance.
U.S. Appl. No. 10/251,025, Jul. 20, 2007, Notice of Allowance.
U.S. Appl. No. 10/739,599, May 30, 2006, Office Action.
U.S. Appl. No. 10/739,599, Dec. 19, 2006, Office Action.
U.S. Appl. No. 10/739,599, May 9, 2007, Office Action.
U.S. Appl. No. 10/739,599, Jun. 28, 2007, Office Action.
U.S. Appl. No. 10/739,599, Mar. 17, 2008, Office Action.
U.S. Appl. No. 10/739,599, Aug. 19, 2010, Notice of Allowance.
U.S. Appl. No. 10/997,305, May 2, 2006, Office Action.
U.S. Appl. No. 10/997,305, Oct. 17, 2006, Office Action.
U.S. Appl. No. 10/997,305, Apr. 10, 2007, Office Action.
U.S. Appl. No. 10/997,305, Dec. 18, 2007, Office Action.
U.S. Appl. No. 10/997,305, May 19, 2008, Office Action.
U.S. Appl. No. 10/997,305, Oct. 6, 2008, Notice of Allowance.
U.S. Appl. No. 11/236,907, May 2, 2006, Office Action.
U.S. Appl. No. 11/236,907, Oct. 19, 2006, Office Action.
U.S. Appl. No. 11/236,907, Mar. 6, 2007, Office Action.
U.S. Appl. No. 11/236,907, Aug. 24, 2007, Office Action.
U.S. Appl. No. 11/236,907, Jan. 25, 2008, Office Action.
U.S. Appl. No. 11/236,907, Aug. 7, 2008, Notice of Allowance.
U.S. Appl. No. 11/638,546, Apr. 10, 2009, Office Action.
U.S. Appl. No. 11/638,546, Oct. 8, 2009, Office Action.
U.S. Appl. No. 11/638,546, Feb. 6, 2012, Office Action.
U.S. Appl. No. 11/638,546, Jul. 18, 2012, Office Action.
U.S. Appl. No. 11/638,546, Aug. 2, 2013, Office Action.
U.S. Appl. No. 11/638,546, Feb. 10, 2014, Office Action.
U.S. Appl. No. 11/900,153, Dec. 3, 2010, Office Action.
U.S. Appl. No. 11/900,153, Apr. 21, 2011, Office Action.
U.S. Appl. No. 11/900,153, Jun. 21, 2012, Notice of Allowance.
U.S. Appl. No. 12/335,792, May 23, 2011, Office Action.
U.S. Appl. No. 12/335,792, Apr. 20, 2012, Office Action.
U.S. Appl. No. 12/335,792, Oct. 2, 2012, Office Action.
U.S. Appl. No. 12/335,792, Jun. 20, 2013, Notice of Allowance.
U.S. Appl. No. 12/948,962, Dec. 5, 2012, Office Action.
U.S. Appl. No. 12/948,962, Jun. 12, 2013, Notice of Allowance.
U.S. Appl. No. 13/687,068, Jan. 2, 2014, Office Action.
U.S. Appl. No. 13/687,068, Oct. 7, 2014, Office Action.
U.S. Appl. No. 10/184,670, Dec. 29, 2014, Office Action.
U.S. Appl. No. 14/323,447, Jan. 16, 2015, Office Action.
U.S. Appl. No. 14/323,472, Jan. 15, 2015, Office Action.
U.S. Appl. No. 10/184,670, Jan. 13, 2017, Office Action.
U.S. Appl. No. 11/638,546, Mar. 28, 2017, Office Action.
U.S. Appl. No. 14/325,053, Apr. 3, 2017, Office Action.
U.S. Appl. No. 14/325,039, Apr. 5, 2017, Office Action.
U.S. Appl. No. 14/328,509, Apr. 5, 2017, Office Action.
U.S. Appl. No. 14/328,516, Apr. 5, 2017, Office Action.
U.S. Appl. No. 10/184,670, Jul. 27, 2017, Office Action.
U.S. Appl. No. 14/323,447, Jul. 28, 2017, Office Action.
U.S. Appl. No. 14/448,725, May 23, 2017, Office Action.
U.S. Appl. No. 10/184,670, Jul. 9, 2015, Office Action.
U.S. Appl. No. 11/638,546, Jul. 13, 2015, Office Action.
U.S. Appl. No. 11/638,546, Mar. 22, 2016, Office Action.
U.S. Appl. No. 13/687,068, Jun. 24, 2015, Office Action.
U.S. Appl. No. 14/323,447, Jun. 24, 2015, Office Action.
U.S. Appl. No. 14/323,447, Jan. 5, 2016, Office Action.
U.S. Appl. No. 14/323,447, Jul. 25, 2016, Office Action.
U.S. Appl. No. 14/323,472, Jun. 25, 2015, Office Action.
U.S. Appl. No. 14/323,973, Jun. 9, 2016, Office Action.
U.S. Appl. No. 11/638,546, Feb. 16, 2018, Office Action.
U.S. Appl. No. 13/687,068, Jan. 29, 2018, Office Action.
U.S. Appl. No. 14/325,053, Dec. 13, 2017, Office Action.
U.S. Appl. No. 14/328,509, Dec. 13, 2017, Office Action.
U.S. Appl. No. 14/328,516, Dec. 13, 2017, Office Action.
U.S. Appl. No. 14/325,039, Oct. 4, 2018, Office Action.
U.S. Appl. No. 14/448,725, Oct. 4, 2018, Office Action.
U.S. Appl. No. 14/328,509, Sep. 7, 2018, Office Action.
U.S. Appl. No. 14/328,516, Sep. 27, 2018, Office Action.
U.S. Appl. No. 13/687,068, Aug. 24, 2018, Office Action.
U.S. Appl. No. 14/325,053, Aug. 28, 2018, Office Action.
U.S. Appl. No. 14/325,039, Mar. 14, 2018, Office Action.
U.S. Appl. No. 14/448,725, Apr. 20, 2018, Office Action.
U.S. Appl. No. 14/325,053, dated Apr. 25, 2019, Office Action.
U.S. Appl. No. 14/328,516, dated May 24, 2019, Office Action.

\* cited by examiner

Fig. 1

| Profile Information – User 102 | |
|---|---|
| Communication Devices | Services |
| Telephone | Brand X |
| Local Service | Bellsouth |
| Long Distance Service | AT&T |
| Wireless Unit | Motorola |
| Service | Cingular |
| Computer | Dell |
| E-mail Service | Microsoft |

CONTEXTUAL INFORMATION

CONTEXTUAL INFORMATION

The present application is a continuation of U.S. patent application Ser. No. 13/687,068, filed Nov. 28, 2012, which is a continuation of U.S. patent application Ser. No. 10/184,588, filed Jun. 28, 2002 now issued as U.S. Pat. No. 8,341,018, which is a continuation-in-part of U.S. patent application Ser. No. 09/966,703, filed on Sep. 28, 2001 now issued as U.S. Pat. No. 7,313,617. Each of the aforementioned patent(s) and application(s) are hereby incorporated by reference in their entirety.

FIELD OF THE INVENTIONS

The inventions relate to the provision of information on communication devices and services.

BACKGROUND

New products and services are brought to the attention of potential users through myriad types of advertising. Recent developments in digital and broadband distribution technologies have enabled targeted contextual advertisement. For example, while viewing a television show, a viewer may request information regarding a star's wardrobe and be provided with retail or other information. The information generally is provided quickly in response to the user's request. By receiving information at a time when the viewer's interest in the particular item is heightened (such as at the time of the request), the viewer is more likely to register the "in-context" marketing information than at other times. Importantly, the viewer is more likely to buy or take other action when information is provided at the time the viewer's interest is heightened. Accordingly, targeted contextual advertisement can be very effective.

Advertising, of course, is the vehicle for bringing new communication devices and services to the attention of potential users. Recent technological advances have made communication devices ubiquitous with different devices satisfying different aspects of the communication needs of a user. For example, a business person may communicate by telephone, a wireless unit, a voicemail system, a pager, an intelligent ("i") pager, a personal digital assistant (PDA), or a facsimile machine. In addition, the business person may communicate electronically using the aforementioned devices and/or a computer through the use of e-mails, instant messages, chat room discussions, and the like.

Generally, communication devices and services are marketed using conventional advertising techniques. For example, a new or improved communication device or service may be advertised on billboards, in newspapers, on flyers, banners, posters, in commercials on the radio and television, and even on hot air balloons and dirigibles ("blimps"). Further, a new or improved communication device or service may be advertised through the use of sponsorships such as product or trademark/service mark placement at entertainment, sports, and other events.

The conventional advertising of communication devices and services may be characterized as a shotgun approach to marketing. A lot of advertising of communication devices and services is conducted so as to reach a broad audience and hopefully turn at least some members of the audience into customers. Conventional advertising may succeed in grabbing the attention of some potential customers, but grabbing the attention of "some" potential customers generally is not enough. Consumers are inundated with so much marketing information that often they become inured to advertising. In other words, consumers may not always "see" or give their attention to conventional advertising. Thus, conventional advertising may miss getting the word out to potential customers.

Further, even if a potential customer pays attention to the conventional advertising of communication devices and services, the advertising may cross the potential customer's attention span at the wrong time or wrong place. A potential customer driving in an automobile who reads a billboard regarding a new communication service may have his or her interest piqued. But the message delivered by the billboard may have been forgotten or superceded by a competitor's message by the time the potential customer is in a position to act.

Accordingly, there is a need for a method or system to deliver information regarding communication devices and services that is directed to the appropriate target audience, that is brought to the attention of the members of the target audience, that is delivered at an appropriate time and place, and that allows a potential customer to act on the information before forgetting the information or having the information superceded by other information.

A solution to the above stated need is targeted contextual advertisement of the communication devices and services. As noted above, targeted contextual advertisement is the provision of information at a time and in a context when the target's interest is heightened. Such advertising is more likely to gain the attention of the target, and as a result, the target is more likely to buy or take action based on the advertised information.

But the implementation of targeted contextual advertising for communication devices and services heretofore has been problematic. How does advertising target potential customers of communication devices and services in a contextual manner? Is a user of a communication device to be sent commercial information to be listened to or to be read from the face plate of the device? Will the delivery of such information be appropriately targeted? Will the delivery of such information be appropriately timed? Will the user pay attention to the information? Will the user act on the information? Or will the information be considered intrusive or annoying by the user or otherwise cause the user to have negative associations with the advertised communication device or service?

In sum, there is a need for a method or system that implements targeted contextual advertisement of communication devices and services. Further, there is a need for a method or system that implements targeted contextual advertisement of communication devices and services so the information is delivered in an appropriate contextual manner.

SUMMARY

Methods and systems are described regarding the presentation to a user of contextual information relating to a communication directed to the user. The contextual information may relate to a communication device and/or a communication service being used in connection with the communication. Advantageously, the contextual information is provided to the user at a time when the user's interest may be heightened as a result of the communication. As a result, the likelihood of the user's recall of the contextual information or of the user's acting on the contextual information is increased.

More specifically, profile information relating to a user is stored by a communications manager. The profile information may include descriptions of the communication devices and/or communication services used by the user. The communications manager may receive data about communications directed to the user. Data about a communication for the user may be received from a telecommunications manager in a telecommunications network or from a gateway in a data network. The data may include information about the communication device originating the communication and/or information about the communication service(s) involved with the communication.

A comparison is made between the profile information about the user and the data about the communication. Based on the comparison, contextual information relating to the communication is presented to the user. The contextual information may be presented to the user before, during, or after the user participates in the communication. The user may save the contextual information for review at a later time.

In particular, the contextual information presented to the user may refer to a communication device and/or communication service used in the communication. For example, the contextual information may inform the user of the type of communication device and/or service being used by the originating party.

The contextual information may relate to a discrepancy between the profile information relating to the user and the originating communication device and/or communication service. The contextual information presented to the user may include information relating to the discrepancy. As an example, the user may not have a wireless unit. The communication for the user may have originated from a wireless unit. Thus, the contextual information presented to the user may include advertising, technical, or other information relating to wireless units.

Once the user is presented with contextual information, the user may be offered additional contextual information. To further the example discussed above, once the user is presented with the contextual information about wireless units in general, the user may request and be presented with more particular information about a specific wireless unit or brand of unit. The more particular information may be presented to the user through a connection to a web site in a data network where the web site has the particular information about the specific wireless unit or brand of unit.

Further, the contextual information and the additional contextual information may be obtained from the communication manager, from a telecom manager in a telecommunications network, or from a gateway in a data network. Advantageously, a service provider or other entity that controls the content of the contextual information may have exclusive marketing access to the user and may be presented with such access at a time when the user's interest is heightened.

In sum, the inventions described herein allow for the targeted contextual advertisement of communication devices and services. Further, the inventions implement the targeted contextual advertisement of communication devices and services so the information is delivered in an appropriate contextual manner.

DETAILED DESCRIPTION

Stated generally, the inventions provide contextual information regarding communication devices or services. For example, a user may receive a call from a friend who is using a wireless unit. The user may not have or use a wireless unit. While the user is engaged in the call with the friend or afterwards, the user may be provided with contextual information relating to the wireless unit used by the friend. The contextual information may contain advertising or other information relating to the wireless unit. Advantageously, the contextual information regarding the wireless unit is provided to the user at a time when the user's interest in the wireless unit may be heightened as a result of the communication from the friend's wireless unit. As a result, the likelihood of the user's purchase of a similar wireless unit is heightened.

In addition to the inventions described herein, additional inventions relating to the presentation of contextual information are described in the commonly owned patent application entitled Methods and Systems for Providing Contextual Information, filed concurrently with this application in the United States Patent and Trademark Office, and which is incorporated herein by reference.

The present inventions may be implemented through the use of a communications manager. In a related patent application, an exemplary communications and information resource (CIR) manager is described. See U.S. patent application Ser. No. 09/966,703, entitled "Methods and Systems for a Communications and Information Resource Manager," filed Sep. 28, 2001, which is incorporated herein by this reference. The CIR manager may be used to implement the inventions described in this application. Prior to describing the present inventions, some background about the CIR manager is provided.

The CIR Manager

A CIR manager may function as a "super" manager with respect to the communication devices, services, and systems of a user. In particular, the CIR manager may be used to centralize communications activities and information such that the user does not have to (but may) use multiple communications devices. For example, the CIR manager may be used to keep a log of all types of communications related to the user—whatever the device, whatever the service, whatever the network.

An advantage of the CIR manager is the user does not have to check or use each type of device for its own type of messages. Another advantage is the CIR manager may obtain information from resources including third party resources so as to facilitate communications and information gathering activities of the user. With the CIR manager, the user is provided with a centralized, efficient, and user-friendly way to handle communications activities including ways to receive, view, listen to, play, respond to, store, log, monitor, delete, copy, forward, obtain, create, and to take other actions. Moreover, the CIR manager provides the user with personalized management of communications and information resources.

In addition, in managing the communications and information resources of the user, the CIR manager may provide the user with one or more of the following features and advantages:
- Recognition of the user and of others as authorized by the user;
- Remembrance and implementation of authorized users' preferences;
- Aid in finding information and resources;
- Information related to the authorized users' activities and communications including call management and detail;
- Service set-ups, configurations, changes, deletions, additions, updates, and synchronizations;
- Maintenance of user account and preference information, logs, activity logs, schedules, calendars, general directories, personal directories, and the like;
- Unified messaging including notice to the user relating to communications and/or other actions; and
- Contextual information, other information, suggestions, help, updates, reminders, warnings, alerts, and other comments.

The CIR manager may integrate the features described above pursuant to a user's preferences so as to provide efficient, organized, and user-friendly communications and information resource management.

Even though the inventions are described herein by reference to a CIR manager installed in a personal computer (PC), the inventions may be practiced with another manager, and/or other computer system configurations, including hand-held devices, multiprocessor systems, microprocessor based or programmable consumer electronics, mini-computers, mainframe computers, etc.

Figure 1:
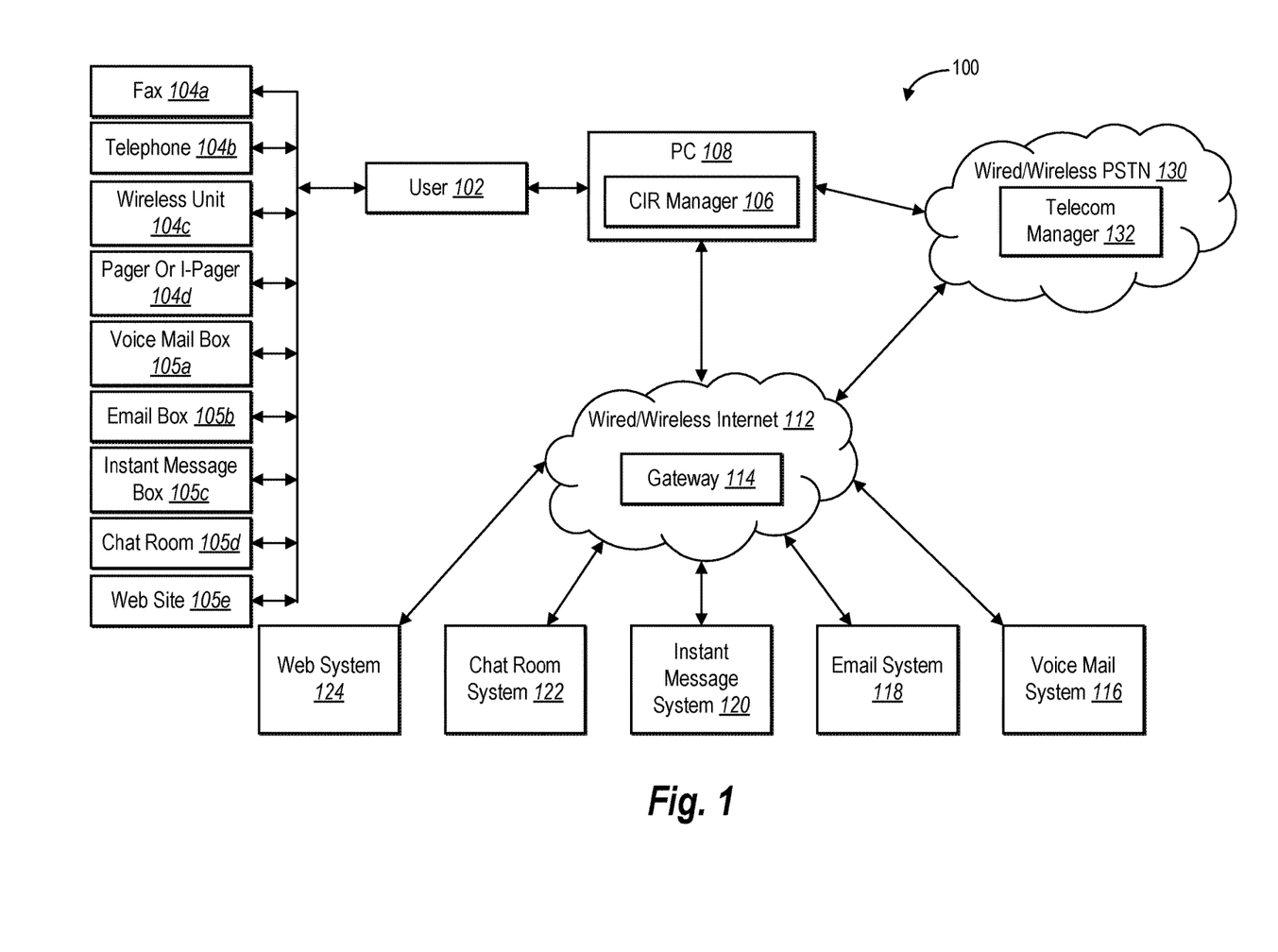
FIG. 1 illustrates an exemplary operating environment of the present inventions.

Exemplary Operating Environment—FIG. 1

FIG. 1 illustrates an exemplary operating environment 100 of the present inventions. A user 102 may use a variety of communication devices including: a facsimile machine (fax) 104a; a telephone 104b; a wireless unit 104c; or a pager or i-pager 104d. The user 102 also may make use of a variety of communication services and be assigned or use functionalities relating to those services. As examples, a user may use: a voice mail system and be assigned a voicemail box 105a; an electronic mail (e-mail or email) system and be assigned an email box (or address) 105b; an instant message system and be assigned an instant message box (or address) 105c; a chat room system and be assigned a chat room (or chat room identity) 105d; or a data network (or web) system and have a web site 105e.

The user's communication devices and services may be managed by a communications manager such as the exemplary CIR manager 106 (described above). As illustrated in FIG. 1, the CIR manager 106 is used with the user's personal computer (PC) 108 and may be directly and/or functionally connected to the user's communication devices and services.

Exemplary functions of a CIR manager 106 are described above. To provide these functions and others, the CIR manager 106 may interact with a variety of systems, networks, and elements that may be directly connected to the CIR manager 106, may be hosted by the same host(s) as the CIR manager 106, may be functionally connected to the CIR manager 106, and/or may be accessible to the CIR manager 106 either directly and/or through other systems, networks, and/or elements.

The CIR manager 106 may communicate through the PC 108 with another computer(s) (not illustrated) connected or otherwise networked with the PC 108. The CIR manager 106 also may communicate with and/or through a data network such as a wired or wireless internet 112 with the following:
- Other computer(s) (not illustrated);
- An administrative center (not illustrated);
- An information resource such as a database (not illustrated);
- A gateway 114 serving the CIR manager 106;
- A voicemail system 116;
- A messaging system such as an email system 118;
- An instant messaging (message) system 120;
- A chat room system 122;
- A web site(s) or web system(s) 124; and
- A telecommunications network (wired and/or wireless) such as the public switched telephone network (PSTN) 130.

In addition, the CIR manager 106 may communicate through the PSTN 130 with the following:
- A telephone (not illustrated);
- A wireless unit (not illustrated);
- A pager or an i-pager (not illustrated);
- A facsimile device (not illustrated);
- A personal digital assistant (not illustrated); and
- A telecommunications manager 132.

Of course, besides the connections illustrated in FIG. 1, the CIR manager 10 may have access to other computers through local area networks (LANs), wide area networks (WANs), direct connections and other dial-up networks.

As noted generally above, the CIR manager 106 may have access through the PC 108 to a data network such as a global communications network like the Internet and through the Internet 26 to other units, networks, and systems. Particularly, the CIR manager 106 may communicate with a gateway 114 connected to or operating on the Internet. The gateway 114 may be a service platform, or other device. The gateway 114 may be provided by the service provider of the CIR manager 106, and may serve the CIR manager 106. Communication activities to and from the CIR manager 106 on the PC 108 may be directed to the gateway 114 and/or may pass through the gateway 114 to other systems, networks, and/or elements. In passing through the gateway 114, the communication activities may be facilitated by the gateway 114.

The gateway 114 may facilitate communications activities of the CIR manager 106 so as to function as a router or director of communications and messages. For example, the CIR manager 106 may forward a request for data to the gateway 114. The gateway 114 may determine the data may be obtained from an information resource (not illustrated). The gateway 114 then forwards the request for data or the appropriate message to the information resource. The information resource may respond to the CIR manager 106 or to the gateway 114, which then communicates with the CIR manager 106.

Further, the gateway 28 may facilitate communications activities between the CIR manager 106 and the PSTN 130, and other elements reached through the PSTN 130 such as the telecom manager 132. Generally, the telecom manager 132 provides general functions and features related to communications of a user. Specifically, the telecom manager 132 may be implemented in a computer, on a service platform, in a network node, or other device. The telecom manager 132 may include connections to devices and networks through integrated services digital network (ISDN) lines and signaling system 7 (SS7) data links. The telecom manager 132 may be capable of functions similar to those of a service switching point (SSP) or service node (SN) of an Advanced Intelligent Network (AIN). For example, the telecom manager 132 may have the following capabilities: signaling, call set-up, routing, and access to databases.

Exemplary Operation of the Present Inventions

Figure 2:
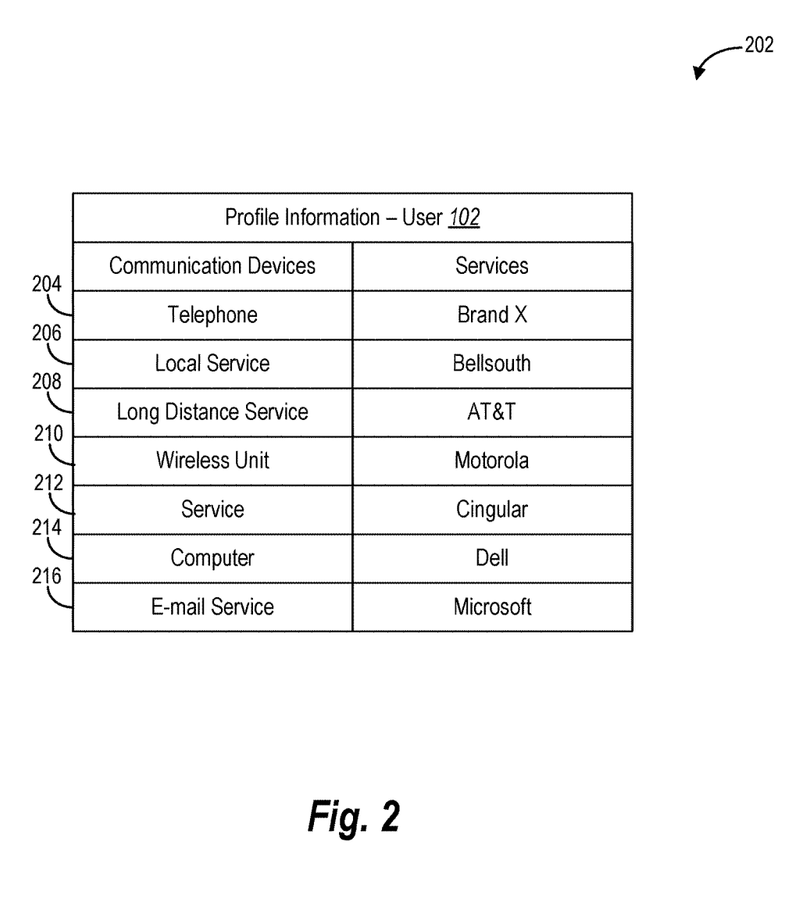
FIG. 2 is a block diagram of exemplary profile information relating to a user.

Profile Information—FIG. 2

To provide a user with contextual information, the present inventions store profile information about the user. Profile information about the user's communicating partners also may be stored. FIG. 2 illustrates in block diagram form the profile information 202 that may be stored about user 102. Similar profile information may be stored about the user's communicating partners. In the exemplary embodiments, the profile information 202 is collected and stored by the CIR manager 106.

Referring to FIG. 2, the profile information 202 for the user 102 may include, among other things, a list of the communication devices and services used by the user. In this example, the user has three communication devices: a telephone 204; a wireless unit 206; and a computer (PC) 208. Each of the entries for the devices may include a description of the respective device. For example, the telephone 204 is described as Brand X. The wireless unit 206 is described as a Motorola unit. The computer 208 is described as a Dell unit. The number of devices and the descriptions of the devices described herein are minimal as they are examples only. Other devices may be included. Generally, the description of a device includes as much information as necessary to be useful in the comparison process described below. For example, the description of a wireless unit may include its brand, trademark, type, and operating specifications, functions, and features.

Also in this example, the user makes use of four communication services. Each service is included in the profile information relating to the user and associated with the appropriate device. Further, each of the services is described in the profile information. As FIG. 2 illustrates, the telephone 204 is associated with local (communication) service 210 from BellSouth and long distance service 212 from AT&T. The wireless unit 206 is associated with service 214 from Cingular. The computer 208 is associated with e-mail service 216 from Microsoft. The number of services and the descriptions of the services described herein are minimal as they are examples only. Other services may be included. As with the communication devices, the description of a communication service in the profile information includes as much information as necessary to be useful in the comparison process described below. For example, the description of a long distance service may identify the service provider and operating specifications, functions and features.

The CIR manager 106 may be provided with data to include in the profile information about the user and about communicating partners. Alternatively, the CIR manager 106 may monitor the user's communications, and be provided with or obtain data to be included in the profile information.

For example, assume the user acquires a pager and uses it with the CIR manager 106. The user supplies the CIR manager 106 with certain data relating to the pager so the pager may operate with the CIR manager 106. The CIR manager 106 also may be supplied with data relating to the pager by the manufacturer or other representative of the manufacturer. Further, the CIR manager 106 may be supplied with data relating to the pager by the service provider providing the paging service. Nevertheless, the CIR manager 106 may require or be able to handle additional data regarding the pager. In some embodiments, the CIR manager 106 may obtain the data about the pager by contacting an information resource (not illustrated) through the gateway 114 over the Internet 112 or through the telecom manager 132 over the PSTN 130. As an example, such an information resource may be a web site of the manufacturer of the pager or administrative center of the service provider providing the user with the paging service.

Figure 3:
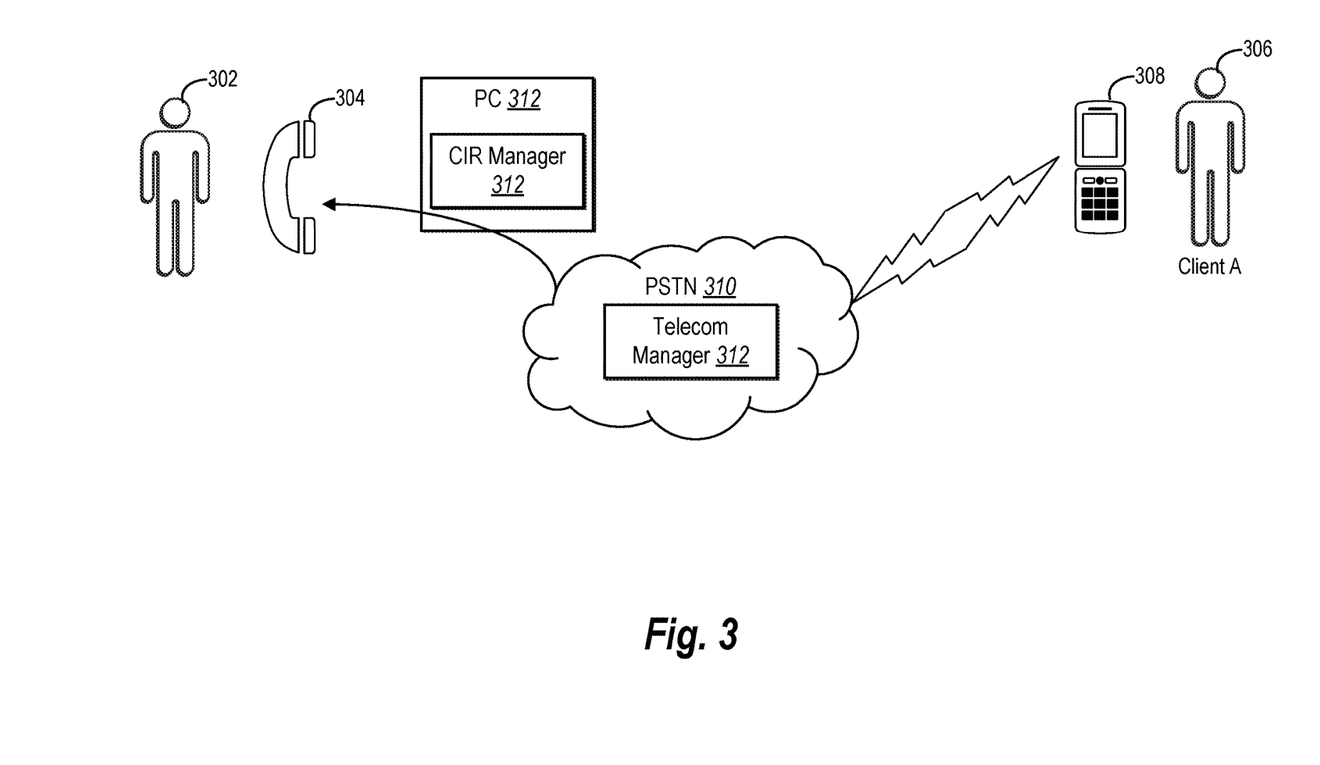
FIG. 3 illustrates an exemplary environment in which the present inventions may provide contextual information.

Example of Presentation of Contextual Information—FIG. 3

Referring to FIG. 3, an exemplary method of providing a user with contextual information is described. In this example, a user 302 makes use of a CIR manager 303 in connection with the user's communications. Assume the user 302 uses a telephone 304 to receive a call from Client A 306. In this example, the user 302 does not have a wireless unit. But Client A 306 uses a wireless unit 308 to make the call to the user. The call is routed from the wireless unit 308 through the appropriate networks such as the public switched telephone network (PSTN) 310, and may be routed through the telecommunications (telecom) manager 213 in the PSTN 310 to the telephone 304 of the user 302. The CIR manager 303 may be part of the routing of the call, or, as noted below, the CIR manager 303 may be provided with data about the call.

The data about the call that the CIR manager 303 may receive may include:

Type of call or communication, e.g., wireline call, wireless call, facsimile (fax) communication, page, i-page, e-mail message, chat room message, instant message, or other communication;

Type of communication device originating the call or communication, e.g., telephone, wireless unit, fax machine, pager, i-pager, personal computer, or other device; and Information about the communication device, e.g., brand name, features, functions, specifications, features, or other information.

In addition, the CIR manager 303 may receive other data relating to the call or communication such as the originating telephone, wireless, or facsimile number, originator (such as caller) identification information, originating electronic mail address or identification, or other data.

Referring to the example presented in connection with FIG. 3, assume the CIR manager 303 is presented with the following data about the call from Client A 306:

The call is from a wireless unit;

The type of the wireless unit is a Brand X unit;

The time sensitivity of the call; and

The wireless unit operates per the IS-41 protocols.

The CIR manager 303 may receive the data about the call from the telecom manager 312 or otherwise. In the case of a communication received from or in connection with a data network, the CIR manager 303 may receive the data about the communication from the gateway in the data network. The receipt of the data by the CIR manager 303 may be the result of the CIR manager's efforts to obtain data about the call or communication. For example, the CIR manager may contact the telecom manager 312 or other entity for the data about the call. As another example, the CIR manager may contact the gateway in the data network for data about a communication. As another example, the CIR manager 303 may use a network address associated with the call or the communication to take action to receive the data. As yet another example, the CIR manager 303 may be provided with an address so as to take action to receive the data.

The CIR manager compares the data about the communication with profile information stored about the user. For example, the CIR manager 303 may compare the type of communication device/service originating the call against the type of device(s)/service included in the profile information of the user. Based on the comparison, the CIR manager 303 may present the user with contextual information that includes specifics about the originating communicating device or service. By way of example, the comparison may find that the caller uses the same type of device/service as the user. The user then may be presented with contextual information such as the following: "The caller is Dale Malik. Same as you, he uses an Acme brand wireless unit and his service provider is Beverly Communication Services." The contextual information also may provide the user with an option(s) of responding to or returning the call or communication by communication paths that are selected based on the data about the call.

The comparison process may look for a discrepancy between the data about the communication and the profile information stored about the user. A discrepancy also may be characterized as a difference or gap in information. As noted, in the example presented in connection with FIG. 3, the user 302 does not have a wireless unit. The CIR manager 303 reaches this conclusion based on its comparison of the data about the call and the profile information about the user 302 and finding the discrepancy of the user not having a wireless unit.

Having determined the user 302 does not have a wireless unit, the CIR manager 303 may take action on this result of the comparison between the profile information of the user and the data about the call. As noted, an action the CIR manager 303 may take is to present contextual information relating to the call. The CIR manager 303 may have such contextual information or may have to obtain contextual information relating to the call. Contextual information may be almost any information relating to the call or communication and communication device or communication service associated with the call or communication. Contextual information may include advertising, marketing, technical, sales, service, safety, or quality information, etc. In addition, contextual information may relate to communication paths and possible alternative communication paths between the originating communicator and the user.

Referring to the example presented in connection with FIG. 3, the CIR manager 303 determines the user 302 does not have a wireless unit based on a comparison of the data about the communication and the profile information relating to the user. The CIR manager 303 may have or may have to act to obtain information about a wireless unit(s) and wireless service and may present the wireless unit and service information as contextual information to the user 302. For example, the CIR manager 303 may contact the telecom manager 312 and obtain information about wireless units that may be appropriate for the user 302.

The CIR manager 303 and the telecom manager 312 may be associated with a particular service provider that also provides services and/or provides wireless units. Thus, the user 302 may be provided with contextual information including information on wireless units and wireless service as available from the particular service provider. Advantageously, the contextual information provided to the user 302 on wireless units and wireless service may laud the products and services of the particular service provider already providing the user with the CIR manager 303 and related service. Thus, the particular service provider has an opportunity to advertise market, and hopefully, to provide additional products and services to the user. The advertising opportunity may be unique to the particular service provider. For example, the information from the particular service provider may be the only contextual information provided to the user in connection with the call from Client A.

Another advantage of the present inventions is that the contextual information is presented to the user at a time when the user's interest in the subject matter may be heightened (i.e., at the time of receipt of a call made from a wireless unit). Thus, the contextual information may serve as very effective advertising.

As an alternative to the particular service provider, the CIR manager 303 may request and receive information to be presented to the user as contextual information from another source. For example, the CIR manager 303 may contact a gateway in a data network for relevant information. The gateway may route the request to or make its own request of an information source. The information source may be a website, database, administrative center, etc. including information on wireless units and service. Of course, the CIR manager 303 may launch multiple queries or requests to and/or through the PSTN 310 or data networks (such as the Internet) for information to be included and presented as contextual information to the user.

As noted in the background, advertising or other information that is presented to a user when the user's interest is heightened is generally more effective or more readily remembered than advertising or information presented at other times. A user's interest in a communication device or service may be heightened at times when the user is involved in communications. Advantageously, the present inventions allow the contextual information described above to be presented to the user at various times in connection with a communication. For example, as described in further detail in the paragraphs below, the user may be presented with contextual information before, during, or after the communication. Moreover, the contextual information may be presented on or through a communication device the user is using for the communication, but the contextual information may be presented on or through another communication device.

Contextual information may be provided to the user when the user is initially presented with the communication or with the data or information about the communication. For example, the user may receive notice of Client A's call from the CIR manager. The CIR manager may provide such notice to the user as a message appearing on the user's computer. In addition to the message about the call, the CIR manager may present the contextual information so it appears on the user's PC. Optionally, the CIR manager may present a short message (such as a balloon of information) that contextual information is available. If the user exercises the option (by double-clicking on the balloon or otherwise), then the contextual information may be presented.

As another example, the user may receive a call on his or her wireless unit. Prior to the call being connected to the wireless unit, the CIR manager may cause the contextual information to be presented to the user in the form of a voice message. Alternatively, the CIR manager may signal the user when the call is connected to the wireless unit with the signal indicating that contextual information is available. The user may choose to listen to or otherwise review the contextual information prior to taking the call.

Similarly, the contextual information may be provided to the user when the user is engaged in the communication. While the user is communicating with Client A on the telephone, for example, the CIR manager may present contextual information on the user's PC. As another example, if the user receives a fax, the CIR manager may cause contextual information to be included in or with the fax.

Further, the contextual information may be provided to the user after the user finishes with the communication. For example, the user may use a telephone to speak with a friend. Before, during, or after the communication, the user may hear a signal (such as three beeps or otherwise) to indicate contextual information is available. When the user finishes the conversation, the user may hook flash the telephone or otherwise take action to access the contextual information. In this example, the contextual information may be provided by the CIR manager as a voice message.

In some embodiments, the user may cause the contextual information to be saved for review at a later time. For example, the user may hear a signal when he or she picks up a wireless call with the signal indicating the availability of contextual information. The user may desire to review the contextual information at a later time. The user may save the contextual information for later review by providing a responsive signal. Further, the user may provide an indication regarding the format in which the contextual information is to be saved. Referring to the example, in response to hearing the signal indicating the availability of contextual information, the user may provide a responsive signal. The user then may hear a list of options regarding the presentation of the contextual information including:
  "to play contextual information now, press '1'";
  "to play contextual information at the end of this call, press '2'";
  "to save contextual information to your PC, press '3'";
  "to e-mail the contextual information, press '4'";
  "to fax me the contextual information, press '5'"
Advantageously, the user is provided with notice of the availability of the contextual information and may determine a format for the review of the contextual information at another time.

Figure 4:
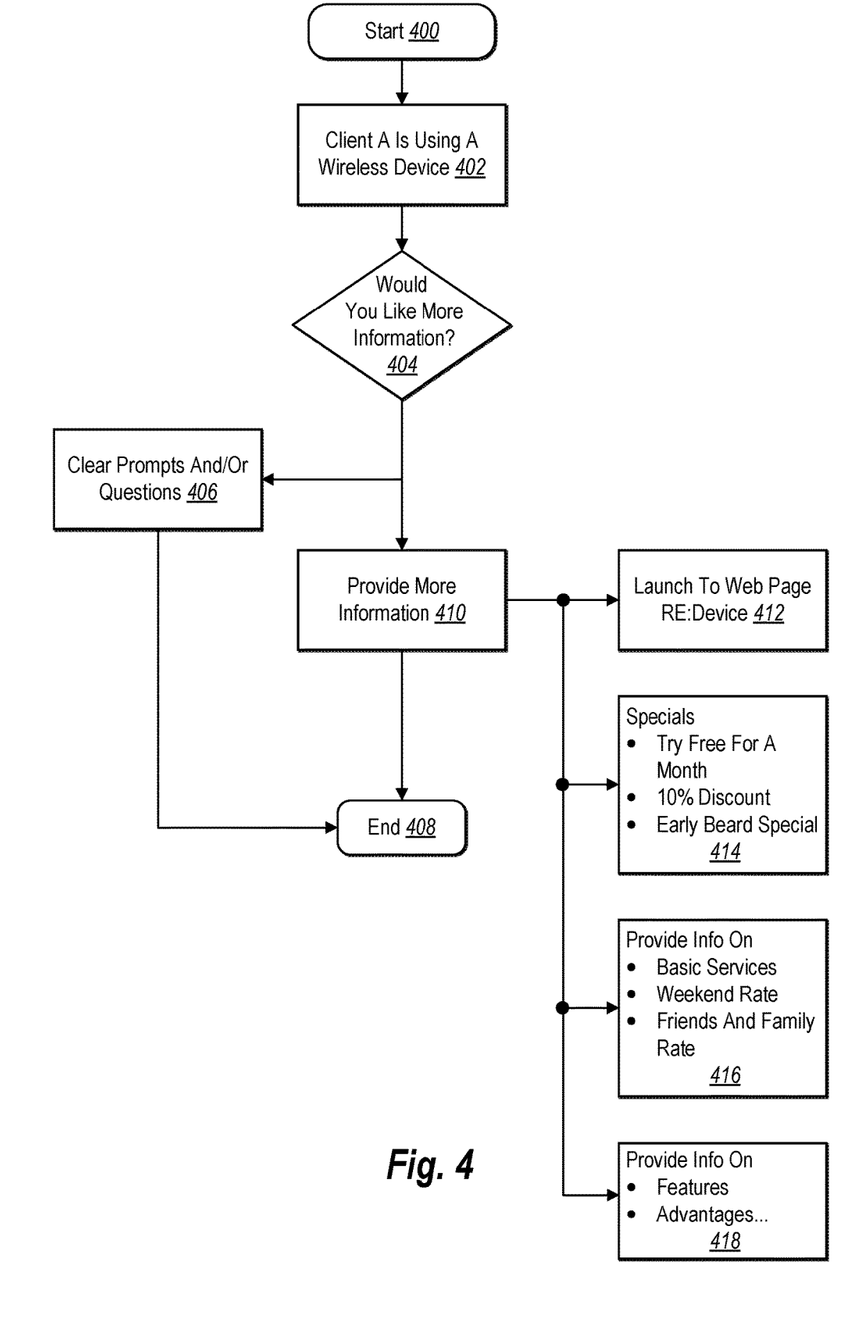
FIG. 4 is an exemplary flow diagram illustrating exemplary actions of the present inventions.

Flow Chart of an Exemplary Presentation of Contextual Information FIG. 4

FIG. 4 is a flow chart illustrating an exemplary process for the presentation of contextual information. For this exemplary process, assume a Client A is using a wireless device to call the user. In the start action 400, the user is notified of the call by an announcement or by a message appearing on his or her computer screen. In addition to the basic information about the call from Client A, in action 402, the process presents the user with information that Client A is using a wireless device. In action 404, the user is asked whether he or she would like "more" information, i.e., contextual information. If there is no response from the user, then the process may continue to query the user for a response as illustrated in FIG. 4, or the process may time out. Alternatively, the default for failing to respond to the query of action 404 may be to present contextual information.

In response to the query of action 404, the user may decline the offer of contextual information. If so, then in action 406 the screen may be cleared of information other than that related to the notification regarding the call. For example, the prompts and/or questions referenced above may be cleared. The process then ends in action 408.

If the user accepts the offer of more information (contextual information), then in action 410 more information is provided. Examples of contextual information that may be provided are set out in adjunct actions 412-418. For example, in action 412 the CIR manager may launch to a web page or side including information about the wireless device.

As another example, the CIR manager periodically may receive special advertising, marketing, technical, or other information. The information may be received from or through the telecom manager in the PSTN or from or through the gateway in a data network. Specifically, a service provider periodically may send information to the CIR manager. This information may be stored by the CIR manager until an appropriate time or opportunity arises when the CIR manager may present the information as contextual information to the user. As action 414 illustrates, such contextual information may include "specials" such as free offers, discounts, early bird specials, etc. Advantageously, by this process, the user may be kept apprised of a service provider's latest discounts, sales, price breaks, etc.

As yet another example, the CIR manager may be configured to include certain information about communication devices and services. Thus, in action 416 the CIR manager may obtain the information from its own resources and present this information as contextual information.

Another example of the provision of contextual information is based on the CIR manager's actions in obtaining the information. For example, the CIR manager may query an appropriate information source through the telecom manager and the PSTN or through the gateway and a data network such as the Internet. The CIR manager then may present the information the CIR manager obtained as contextual information.

Once the contextual information is presented, the exemplary process ends in action 408. But the interaction between the user and the contextual information need not end with such presentation. In exemplary embodiments, the user may be able to obtain additional or different contextual information through a process similar to that described above. More particularly, the CIR manager may offer the user additional contextual information, and based on a positive response, the CIR manager may present the additional contextual information. For example, assume the CIR manager presents the user with information on wireless units. The user may request additional contextual information relating to a specific type of wireless unit. The CIR manager may present additional information on the specific type of wireless unit such as by connecting the user to a web site having such information.

The exemplary embodiments of the inventions described herein were chosen and described in order to explain the principles of the inventions and their practical applications so as to enable others skilled in the art to utilize the inventions including various embodiments and various modifications as are suited to the particular uses contemplated. The examples provided herein in the written description or in the drawings are not intended as limitations of the inventions. Other embodiments will suggest themselves to those skilled in the art. Therefore, the scope of the inventions is to be limited only by the claims below.

The invention claimed is:

1. A method comprising:
  identifying an electronic communication of a first type from a first communication device associated with a first user and intended for a second user associated with a second communication device;
  identifying, by at least one processor, data corresponding to the electronic communication of the first type, the data comprising information about the first communication device associated with the first user;
  comparing the information about the first communication device with user profile information for the second user;

based on the comparison of the information about the first communication device and the user profile information for the second user, determining the first communication device and the second communication device are the same type of communication device;

in response to determining that the first communication device and the second communication device are the same type of communication device, providing, via a graphical user interface on the second communication device, a selectable communication option to initiate electronic communication of a second type between the first communication device and the second communication device; and in response to detecting a selection of the selectable communication option, initiating the electronic communication of the second type between the first communication device and the second communication device.

2. The method of claim 1, wherein
the selectable communication option comprises an option to respond to the electronic communication of the first type using theft electronic communication of the second type.

3. The method of claim 1, wherein the electronic communication of the second type comprises a wireline call, a wireless call, an e-mail, or an instant message.

4. The method of claim 1, further comprising providing one or more selection options for interacting with the selectable communication option, wherein the one or more selection options comprise a touch screen display button selection option.

5. The method of claim 1, wherein the data corresponding to the electronic communication of the first type further comprises identification information corresponding to the first user.

6. The method of claim 5, further comprising, providing the identification information corresponding to the first user on the graphical user interface of the second communication device.

7. The method of claim 1, wherein initiating the electronic communication of the second type between the first communication device and the second communication device comprises:
identifying one or more pre-configured responses; and
providing the one or more pre-configured responses in a list on the graphical user interface of the second communication device.

8. The method of claim 1, wherein identifying data corresponding to the electronic communication of the first type comprises identifying header information that comprises the information about the first communication device associated with the first user.

9. The method of claim 1, further comprising identifying a message history between the first user and the second user.

10. The method of claim 9, wherein initiating the electronic communication of the second type between the first communication device and the second communication device further comprises providing at least a portion of the message history in connection with the electronic communication of the second type.

11. The method of claim 1, further comprising:
identifying an additional electronic communication from a third communication device associated with a third user and intended for the second user associated with the second communication device;
identifying, by the at least one processor, additional data corresponding to the additional electronic communication, the additional data comprising additional information about the third communication device associated with the third user;
comparing the additional information about the third communication device with the user profile information for the second user;
based on the comparison about the additional information about the third communication device and the user profile information for the second user, determining the third communication device and the second communication device are different types of communication devices; and
in response to determining that the third communication device and the second communication device are different types of communication devices, providing, via the graphical user interface on the second communication device, one or more additional selectable communication options between the third communication device and the second communication device, the one or more additional selectable communication options not including the selectable communication option between the first communication device and the second communication device.

12. A non-transitory computer-readable medium storing instructions thereon that, when executed by at least one processor, cause a computer system to:
identify an electronic communication of a first type from a first communication device associated with a first user and intended for a second user associated with a second communication device;
identify data corresponding to the electronic communication of the first type, the data comprising information about the first communication device associated with the first user;
compare the information about the first communication device with user profile information for the second user;
based on the comparison of the information about the first communication device and the user profile information for the second user, determine the first communication device and the second communication device are the same type of communication device;
in response to determining that the first communication device and the second communication device are the same type of communication device, provide, via a graphical user interface on the second communication device, a selectable communication option to initiate electronic communication of a second type between the first communication device and the second communication device; and
in response to detecting a selection of the selectable communication option, initiate the electronic communication of the second type between the first communication device and the second communication device.

13. The non-transitory computer-readable medium of claim 12, further storing instructions thereon that, when executed by the at least one processor, cause the computer system to:
based on the detected interaction with the selectable communication option, receive, for the second communication device associated with the second user, a response to the electronic communication of the first type via a communication path corresponding to the electronic communication of the second type.

14. The non-transitory computer-readable medium of claim 13, wherein the communication path corresponding to the electronic communication of the second type is different than a communication path of the electronic communication of the first type.

15. The non-transitory computer-readable medium of claim 12, wherein determining the first communication device and the second communication device are the same type of communication device comprises determining that the first communication device and the second communication are the same brand of communication device.

16. The non-transitory computer-readable medium of claim 15, wherein initiating the electronic communication of the second type between the first communication device and the second communication device comprises selecting the electronic communication of the second type based on the brand of the communication device.

17. The non-transitory computer-readable medium of claim 12, wherein the data corresponding to the electronic communication of the first type further comprises identification information corresponding to the first user.

18. The non-transitory computer-readable medium of claim 17, further storing instructions thereon that, when executed by at least one processor, cause the computer system to, in response to initiating the electronic communication of the second type between the first communication device and the second communication device, provide the identification information corresponding to the first user on the graphical user interface of the second communication device.

19. The non-transitory computer-readable medium of claim 18, further storing instructions thereon that, when executed by at least one processor, cause the computer system to identify a message history between the first user and the second user; and
wherein initiating the electronic communication of the second type between the first communication device and the second communication device further comprises providing at least a portion of the message history in connection with the electronic communication of the second type.

20. A system comprising:
at least one processor; and
at least one non-transitory computer-readable storage medium storing instructions thereon that, when executed by the at least one processor, cause the system to:
identify an electronic communication of a first type from a first communication device associated with a first user and intended for a second user associated with a second communication device;
identify data corresponding to the electronic communication of the first type, the data comprising information about the first communication device associated with the first user;
compare the information about the first communication device with user profile information for the second user;
based on the comparison of the information about the first communication device and the user profile information for the second user, determine the first communication device and the second communication device are the same type of communication device;
in response to determining that the first communication device and the second communication device are the same type of communication device, provide, via a graphical user interface on the second communication device, a selectable communication option to initiate electronic communication of a second type between the first communication device and the second communication device; and
in response to detecting a selection of the selectable communication option, initiate the electronic communication of the second type between the first communication device and the second communication device.

21. The system of claim 20, wherein the selectable communication option comprises an option to respond to the electronic communication of the first type using the electronic communication of the second type.

22. The system of claim 20, wherein the electronic communication of the second type comprises a wireline call, a wireless call, an e-mail, or an instant message.

23. The system of claim 20, wherein determining the first communication device and the second communication device are the same type of communication device comprises determining that the first communication device and the second communication are the same brand of communication device.

24. The system of claim 23, wherein initiating the electronic communication of the second type between the first communication device and the second communication device comprises selecting the electronic communication of the second type based on the brand of the communication device.

25. The system of claim 24, further comprising instructions that, when executed by the at least one processor, cause the system to provide identification information corresponding to the first user on the graphical user interface of the second communication device.

* * * * *